United States Patent [19]
Parker

[11] 3,981,429

[45] Sept. 21, 1976

[54] METHOD FOR PLATED FOIL LIQUID INTERFACE DIFFUSION BONDING OF TITANIUM

[75] Inventor: Elmo G. Parker, La Mesa, Calif.

[73] Assignee: Rohr Industries, Inc., Chula Vista, Calif.

[22] Filed: Jan. 29, 1973

[21] Appl. No.: 327,341

Related U.S. Application Data

[63] Continuation of Ser. No. 81,262, Oct. 16, 1970, abandoned.

[52] U.S. Cl. .............................. 228/194; 228/195; 228/238; 228/263
[51] Int. Cl.² ......................................... B23K 31/02
[58] Field of Search ................... 29/198, 498, 501; 228/194, 195, 238, 263, 252, 254

[56] References Cited
UNITED STATES PATENTS

| | | | |
|---|---|---|---|
| 2,900,713 | 8/1959 | Young | 29/501 X |
| 2,906,008 | 9/1959 | Boegehold et al. | 29/498 X |
| 3,222,775 | 12/1965 | Whitney | 29/498 X |
| 3,365,787 | 1/1968 | Forsberg et al. | 29/471.1 |
| 3,369,288 | 2/1968 | Halnan | 29/502 X |
| 3,417,461 | 12/1968 | Wells et al. | 29/498 X |
| 3,442,010 | 5/1969 | Albers | 29/498 X |
| 3,455,663 | 7/1969 | Zdanuk | 29/198 |
| 3,466,737 | 9/1969 | Hanink | 29/502 X |
| 3,581,382 | 6/1971 | Wells et al. | 29/502 X |

OTHER PUBLICATIONS

"Metals Handbook," 8th edition, vol. 1, published by American Society For Metals, see p. 5, brazing sheet.

*Primary Examiner*—Richard B. Lazarus
*Attorney, Agent, or Firm*—Patrick J. Schlesinger

[57] ABSTRACT

For the diffusion bonding of members of titanium and some titanium alloys, layers of Cu, Ag and Ni are deposited by plating on both sides of a sheet of etched, chemically clean, titanium or titanium alloy foil of a thickness preferably less than 0.001 inch. The plated foil is interposed between faying surfaces of the members to be bonded together, and the members, with the interposed foil, are sealed under pressure, in an inert atmosphere and under partial vacuum or hard vacuum of, for example, $10^{-4}$ Torr. The parts thus prepared are heated to brazing temperature to render liquidus plating material and thereby establish a diffusion bridge between each plated face of the foil and the adjacent faying surface of each of the members to promote atomic transport of titanium thereacross and established a joint therebetween. Heating is continued to induce atomic diffusion in the zone or region of the joint thus established between the titanium of the foil and the members, and between the members themselves, until the diffusion zone becomes principally titanium with traces of plating materials diffused throughout the region of the joint.

12 Claims, 4 Drawing Figures

INVENTOR.
ELMO G. PARKER
BY
George E. Pearson
ATTORNEY

METHOD FOR PLATED FOIL LIQUID INTERFACE DIFFUSION BONDING OF TITANIUM

This is a continuation of application Ser. No. 81,262, filed Oct. 16, 1970, and now abandoned.

BACKGROUND OF THE INVENTION

This invention relates to the diffusion bonding of titanium and some titanium alloys. It is known that when two members of titanium are placed with clean, faying surfaces thereof in intimate, overall pressurized contact, in an inert atmosphere, under partial vacuum, and heated to a predetermined temperature well below the melting point of titanium, atomic diffusion occurs across the joint between the members so that the two members become integrally bonded together. However, any lack of full and complete contact and complete chemical cleanness at the faying surfaces inhibits the diffusion bonding of the members. Previously filed U.S. patent applications Ser. No. 765,156 filed Oct. 4, 1968, and now abandoned and Ser. No. 888,501, filed Dec. 29, 1969, now U.S. Pat. No. 3,768,985 both by James R. Woodward, and both assigned to the assignee of the present invention, pertain to the plating of one or both of the faying surfaces of two titanium members to be joined by diffusion bonding, so that when the members are placed with their plated surfaces in contact with each other, in an inert atmosphere, under partial vacuum, and heated, plating metal will melt and thereby form a liquid bridge between the faying surfaces across which the atomic diffusion of titanium of the members is greatly accelerated. These prior developments, known as liquid interface diffusion bonding, have proven highly effective in use, but with some titanium parts to be thus joined, the plating of the faying surfaces has proven cumbersome, and not always adapted to large production. Furthermore, the plating of each part is an added, and frequently costly operation.

SUMMARY OF THE INVENTION

An extremely thin sheet of foil of commercially pure titanium, or a selected alloy thereof, hereinafter sometimes referred to as titanium base members, with both sides thereof etched and chemically clean, and each side plated with one or more layers of compatible brazing material, is interposed between fitted, chemically clean, faying surfaces of two members of titanium or selected titanium alloys to be joined by liquid interface diffusion bonding. The members are subjected to required pressure in an inert atmosphere under partial or hard vacuum at a temperature to initially render liquidus part or all of the plating metal or metals, and are thereafter sustained at a required temperature to promote atomic diffusion of the plating material and the titanium of the foil and of both members in the zone of the interface, thereby developing a diffusion bond between the members in such zone consisting principally of titanium, with small amounts of the plating metal or metals diffused therein.

BRIEF DESCRIPTION OF THE DRAWINGS

The foregoing objectives and advantages of the invention will be apparent from the following description and the accompanying drawings, wherein.

DETAILED DESCRIPTION

Figure 1:
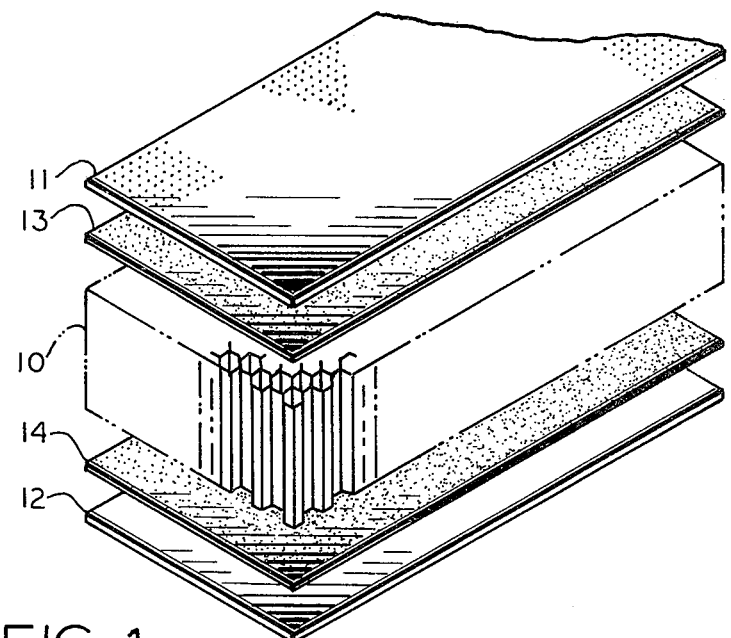
FIG. 1 is an exploded, fragmentary, perspective view of a small piece of the honeycomb core of a honeycomb sandwich panel with a sheet of plated titanium foil interposed between each end of the core and a facing sheet to be joined thereto.

Referring to the drawings in detail, FIG. 1 shows a fragment of the honeycomb core 10 for a honeycomb sandwich panel of a type commonly used in aircraft and other structures where a structural panel of high strength, stiffness, and light weight is required. The core 10 and its usual two facing sheets 11 and 12 are of titanium or a selected titanium alloy.

Sheets 13 and 14 of plated foil of titanium or selected titanium alloy are interposed, respectively, between the facing sheets 11 and 12 and the core 10. In preparing the foil sheets 13 and 14, both sides of each sheet are surface-etched by a suitable etchant, for example, one containing sulfuric and chromotropic acids, to a uniform rough texture similar to that obtained by dust blasting, with a resultant foil thickness of the order of less than 0.001 inch. This thickness is not critical, but preferably does not exceed 0.0006 inch. The foil is then subjected to a thorough cleaning process, for example as set forth in U.S. Pat. No. 3,379,645 to Kendall, which patent is assigned to the assignee of the present invention. It is recommended that the ultimate possible degree of chemical cleanliness of the foil surface be attained, since any foreign matter in the resultant joint would be deleterious.

The etched, cleaned foil is then plated, preferably on both sides, with a layer or successive layers of suitable, compatible brazing metal or metals which will provide the required diffusion bridge, and will diffuse in the resultant bonded joint. At this point in the development of the invention a plating procedure of optimum effectiveness and desirability probably has not yet been found, since a great many of the elements of the periodic table react in compound form with titanium, and research is still in progress to discover better plating materials and procedures for use in the practice of the invention. However, the presently preferred plating procedure is Cu-Ag-Ni in that order on each side of the etched foil with an overall coating of 6 g/ft$^2$ thickness on each side. The presently preferred percentages of the plating metals are Cu 38%, Ni 38% and Ag 24%.

In bonding the parts shown in FIG. 1 in accordance with the invention, the facing sheets 11 and 12 and the honeycomb core 10 are cleaned to a high degree of chemical cleanliness, for example, by the same process as that used to clean the foil, and the plated foil sheets 13 and 14 are interposed, respectively, between the facing sheets 11 and 12 and the core 10. The assembly is then subjected to required pressure toward the foil, in the nature of a conventional braze package and in accordance with the procedure set forth in the aforementioned applications, in a suitable inert atmosphere, under partial vacuum, or under hard vacuum of the order of $10^{-4}$ Torr. The parts are then heated to a temperature which renders liquidus plating metal or metals on each plated side of each interposed foil sheet, thereby establishing a liquid bridge between each side of the foil sheet and the faying surface of the adjacent member.

With the plating materials Ag-Cu-Ni mentioned, an initial temperature of the order of 1780°F has been found satisfactory. After at least a portion of the plating material has been rendered liquidus to thereby establish an atomic bridge between each side of the foil and its adjacent member, the heating is continued at a temperature to promote required atomic diffusion across the bridge thus established. Since the time and temperature required for such bonding may vary with the eutectic effect of various plating materials employed, such parameters will be determined by conventional calculations and test procedures for each structure, part material, and plating material or materials employed. However, temperatures within the range 1450°F – 1800°F, and usually about 1780°F, have been found satisfactory for the foil liquid interface diffusion bonding of the component parts of a titanium honeycomb core sandwich of the type shown in FIG. 1.

In bonding a honeycomb core panel in accordance with the invention as shown in FIG. 1, only the edges of the cell walls of the honeycomb core contact the inner face of the foil, the foil areas within the cells being free of core support. Cut-away inspection of such sandwich panel after bonding discloses that a portion of the exposed foil within these open cell areas, by surface tension, forms fillets at the joints between each facing sheet and the cell walls of the honeycomb core, a portion of the remainder of the foil and its plating in these areas is diffused into the surface of the facing sheet, and any remainder is in the form of a gray, foamy trace on the inner side of the facing sheet.

Figure 2:
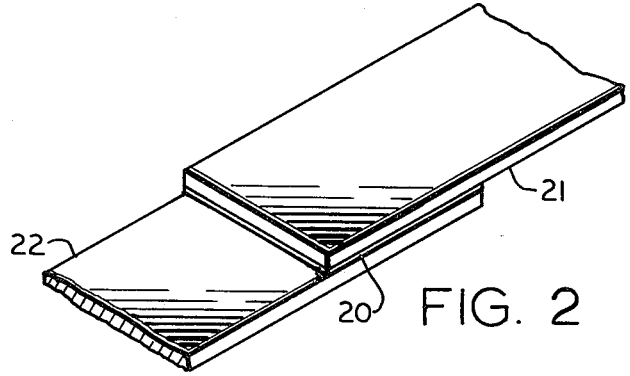
FIG. 2 is a perspective view of two thick section titanium members with a layer of the plated titanium foil interposed therebetween.

In the bonding of thick section parts as shown in FIG. 2, the same general procedure is followed as that described previously herein for the brazing of the honeycomb sandwich panel of FIG. 1. A sheet 20 of plated titanium foil, prepared as described previously herein for the foil layers 13 and 14, is interposed between the faying surfaces of parts 21 and 22 of titanium or selected titanium alloy or alloys to be bonded together. However, in the bonding of such members or parts the plated foil preferably is shaped to fit the faying surfaces of the parts or members which are to be bonded together. This avoids the possibility of contamination by the plating or foil materials of any area of either of the members beyond the area or areas of bonding.

Figure 3:
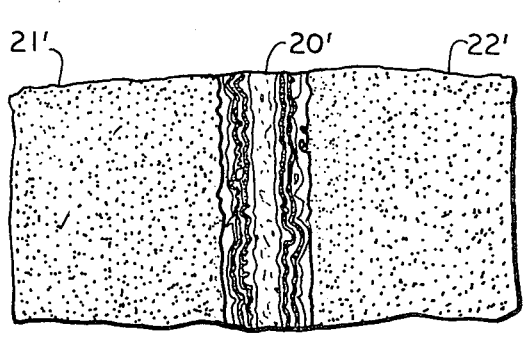
FIG. 3 is a drawing of a greatly enlarged microphotograph showing a cut sectional through a sheet of the plated foil interposed between the faying surfaces of two titanium members to be joined by liquid interface diffusion.
Figure 4:
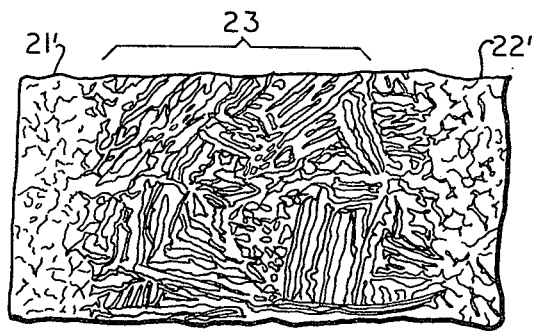
FIG. 4 is a microphotograph similar to FIG. 2 after the liquid interface diffusion bonding of the parts has been completed.

The drawing of a microphotograph, in FIG. 3 shows a layer of the plated foil, designated 20', interposed between fragments of titanium members 21' and 22' to be bonded. FIG. 4 shows the diffusion zone 23, as described herein in which the diffusion bonding occurs, and throughout which foil plating materials are dispersed in minute quantities upon completion of the foil bonding.

The present invention greatly enhances in many instances the production potential and simplicity of bonding, since the plated foil can be prepared in advance of use in the form of sheets and rolls, can be cut or formed by dies or otherwise as desired to fit specific applications, and can be stored, transferred, and handled as required. The fact that two plated surfaces are available, one on each side of the foil, allows for the provision of additional plating material for the bond if desired. Additionally, the use of the foil allows close process control, since test samples can be cut from the foil and tested, a procedure impossible when the plating is imposed directly on a faying surface of a member or part to be liquid interface diffusion bonded.

Having thus described my invention, what I claim as new and useful and desire to secure by U.S. Letters Patent is:

1. The method of plated foil liquid interface diffusion bonding of two titanium base members which comprises:
   a. providing a thin plated titanium base foil having a thickness of the order of less than 0.001 inch,
   b. placing on at least one side of said foil laminar diffusion bridge materials consisting of successive plating layers of Cu-Ag-Ni plated thereon in the order named,
   c. interposing said plated foil between the faying surface of said base members,
   d. subjecting the members to compressive force urging the same into contact with the interposed foil at their respective foil interfaces,
   e. heating the members and foil in a protective atmosphere to a temperature of the order of 1450°F. to 1800°F. which is sufficient to form a liquid interface diffusion bridge at each said interface of the members and foil, and
   f. continuing and holding said heating at a temperature level and for a period of time sufficient to cause atomic transport of the titanium of the foil and members across said interfaces therebetween to form a bonding zone at each interface in which the titanium of the foil and member is diffused and in which the diffusion bridge materials are diffused and diluted throughout the zone.

2. The method claimed in claim 1 wherein the protective atmosphere is a hard vacuum of the order of $10^{-4}$ Torr.

3. The method claimed in claim 1 wherein the two members are solid sections and the foil plated on both sides is interposed therebetween.

4. The method claimed in claim 1 wherein the foil is etched prior to plating and is of a thickness when etched of the order of 0.0006 inch to less than 0.001 inch.

5. The method claimed in claim 1 wherein the foil is used to bond facing sheets of titanium or titanium alloy to the ends of a honeycomb core of titanium or selected titanium alloy to make a honeycomb sandwich panel, and a sheet of the foil, plated on both sides thereof, is interposed between each of the facing sheets and an end of the honeycomb core.

6. The method claimed in claim 1 wherein the foil is cut to fit only the areas defined by the faying surfaces of the two members.

7. The method claimed in claim 1 wherein said diffusion bridge material is placed on both sides of said foil in an amount of about 6 grams per square foot of titanium base foil on each side of said foil, the ratio of Cu:Ni:Ag being about 38:38:24 respectively.

8. The method claimed in claim 7 wherein the protective atmosphere is a hard vacuum of the order of $10^{-4}$ Torr.

9. The method claimed in claim 7 wherein the two members are solid sections and the foil plated on both sides is interposed therebetween.

10. The method claimed in claim 7 wherein the foil is etched prior to plating and is of a thickness when etched of the order of 0.0006 inch to less than 0.001 inch.

11. The method claimed in claim 7 wherein the foil is used to bond facing sheets of titanium or titanium alloy to the ends of a honeycomb core of titanium or selected titanium alloy to make a honeycomb sandwich panel, and a sheet of the foil, plated on both sides thereof is interposed between each of the facing sheets and an end of the honeycomb core.

12. The method claimed in claim 7 wherein the foil is cut to fit only the areas defined by the faying surfaces of the two members.

* * * * *